United States Patent [19]

Baranski

[11] Patent Number: 4,984,897
[45] Date of Patent: Jan. 15, 1991

[54] CARRIAGE MECHANISM FOR AUTOMATIC EXTRACTING AND INSERTING OF CASSETTES

[75] Inventor: Antoni S. Baranski, San Carlos, Calif.

[73] Assignee: Ampex Corporation, Redwood City, Calif.

[21] Appl. No.: 399,401

[22] Filed: Aug. 25, 1989

Related U.S. Application Data

[63] Continuation of Ser. No. 227,412, Jul. 29, 1988, abandoned, which is a continuation of Ser. No. 851,047, Apr. 11, 1986, abandoned.

[51] Int. Cl.$^5$ .............................................. G11B 15/68
[52] U.S. Cl. ..................................... 360/92; 360/137
[58] Field of Search ................................... 360/92, 137

[56] References Cited

U.S. PATENT DOCUMENTS

3,938,190  2/1976  Semmlow et al. ................ 360/92
4,527,262  7/1985  Manto ................................ 369/38
4,594,042  6/1986  Hoffman ............................ 360/92

Primary Examiner—John H. Wolff
Attorney, Agent, or Firm—Harry G. Thibault; George B. Almeida

[57] ABSTRACT

A carriage mechanism operable with a picker assembly mounted at the face of a bin structure having discrete bin locations within that structure for storing cassettes, the picker assembly moveable along the face of the bin structure and between bin locations, the carriage mechanism operable to extract a cassette from a first bin location, and load it into a cassette-receiving envelope of the carriage mechanism at a selected stored position of the envelope for transport to a second bin location remote from the first location. A bumper element mounted on the carriage mechanism at a fixed reference point is provided to move cassettes out of interferring relation with the carriage mechanism, by sweeping all X-Y coordinates of the face of the bin structure with the picker assembly to displace misaligned cassettes.

21 Claims, 7 Drawing Sheets

FIG_1

FIG_2

FIG_3

FIG 5

FIG_6

FIG_7

FIG_8

CARRIAGE MECHANISM FOR AUTOMATIC EXTRACTING AND INSERTING OF CASSETTES

This is a continuation of copending U.S. application Ser. No. 227,412, filed on July 29, 1988, which is a continuation of U.S. application Ser. No. 851,047 filed on Apr. 11, 1986, since abandoned.

The present invention relates to cart spot players and in particular to a Z-axis assembly usable with a carriage mechanism usable with a tape library of a cart spot player.

A cart (for "cartridge") spot player is a combination of a cassette storage apparatus to store magnetic tape cassettes which are used to record commercials, or spots, and a playback device, such as a videotape recorder or tape transport, to reproduce those spots on cue and in a specified order. Commercials, generally prepared by advertising agencies, are distributed to each station from which the advertiser has purchased air time. Each spot is recorded on to a separate cassette. The cassettes are stored in a bin structure or tape library of the cart spot player. The cart spot player is then programmed to play a sequence of spots. The failure of the cart spot player to perform the programmed sequence without error can cost the broadcasting station advertising dollars.

One form of a bin structure is a planar array which can be defined by X-Y coordinates. To access the bins, an interface mechanism must not only be able to traverse all X-Y coordinates of the bin structure to deliver the cassettes from the bin structure to the videotape recorder for play, but also be able to extract a cassette from a bin at a first bin location and insert that cassette into the tape transport or into a bin at a second bin location. To extract the cassette, the interface mechanism must reach into the bin in a Z-axis direction to grip the cassette for extraction. Hence, such mechanisms are known as Z-axis mechanisms.

The X-Y mechanism which drives the Z-axis mechanism of a cart spot player can be an elevator accessing one or more rotating bin-holding carrousels or even a rotary device which accesses the interior bin structure of a multi-sided cart spot player. Either player, in conjunction with a Z-axis mechanism, extracts cassettes from specific bin locations within the bin structure and delivers them to a specific tape transport for play, returning the cassette from the transport to the bin location after use.

However, the Z-axis mechanisms which are used by these players are gripping mechanisms which either engage one edge of a cassette with opposing jaws to create a potential for cassette or even tape damage by compressive loading or engage one side of a cassette at opposite ends in an extremely cumbersome mechanical arrangement intended to minimize cassette damage.

Automated loading of the bin structure in cart spot players requires a Z-axis mechanism which can swiftly and accurately engage a cassette, load it into a carriage mechanism for transport, load it into a second bin location after transport and repeat the above process swiftly and continuously. An automated loading environment requires the carriage mechanism not only to be able to extract misaligned or mispositioned cassettes from the bin structure, but also to locate a cassette on the carriage mechanism in a preferred aligned position for insertion into a second bin location, not only to load the bin structure but also to access the tape transports. The known Z-axis mechanisms are not capable of operating in a high speed, high capacity, automated loading environment.

Therefore it is desirable to devise a cassette spot player which achieves substantially increased library capacity, having improved speed and accuracy in accessing that library, the accessing performed by a device of relative simplicity, such device also servicing the tape transports. Such cart spot player achieves its speed and accuracy with a construction dedicated to an automated cassette input which minimizes moving parts through the use of a stable and immovable tape library having a bin structure which interfaces with a cassette transfer assembly moveable between bin and transport locations which has sufficient speed to load the bin structure by the swift transport of a cassette from a loading station to archival storage and which includes a carriage mechanism which can swiftly and precisely extract a cassette via a unique Z-axis mechanism, from a first bin location and deliver it to a preferred stored position within the carriage mechanism, for transport to a second bin or transport location remote from the first, and perform such an operation on a repeatable basis.

Accordingly, the present invention provides, at the heart of the cassette transfer assembly, a carriage mechanism having a Z-axis mechanism or picker operative to extract a cassette from a first bin location in the bin structure and load the cassette into the carriage mechanism for transport to a second bin location within the bin structure for insertion. The carriage mechanism may also extract a cassette from any bin location and deliver it to a tape transport for play. To assure the speed and accuracy of the cassette transport function of the cassette transfer assembly, the carriage mechanism is outfitted with relatively sophisticated cassette locating, extracting, storing and moving devices. For example, the cassette extracting mechanism comprises a cassette hook mounted on a Z-axis linear drive mechanism carried on the carriage mechanism; the drive mechanism is controlled by a drive motor which is driven by a position servo and is operable to drive a locating "knee" displaced from the cassette hook into engagement with a cassette located at a specific bin location. The locating "knee" provides an substantial and repeatable accuracy to the process of locating and extracting cassettes and engages an edge of the cassette to align the cassette hook over a designated target zone on the cassette. The cassette transfer assembly inserts the cassette hook into an engagement portion provided within the target zone. With the cassette hook engaging the cassette, the drive mechanism can be reversed to draw the cassette out of the first bin location and into a cassette receiving envelope provided on the carriage mechanism for transport.

To assure the effective transfer of the cassette from a first bin location to a second bin location, the carriage mechanism itself specifically aligns the cassette with a cassette-receiving envelope within the mechanism to assure the expeditious and accurate disposition of that cassette from the carriage mechanism at the second bin location. A first locating mechanism provided in the carriage mechanism comprises specifically located fixed guide rails mounted on the floor and one side of the carriage mechanism and provided for carrying the cassette within the envelope. A second locating mechanism which locates the cassette within the cassette receiving envelope comprises a moveable side and a moveable top rails which accept and then bias the cassette to a selected stored position within the cassette receiving envelope. The rails align the cassette with respect to first and second axes of the cassette receiving envelope. The position servo draws the cassette to a selected position with respect to a third axis of the cassette receiving envelope. These mechanisms combine to place a cassette loaded into the carriage mechanism in a selected stored position designated for optimum transport and unloading conditions. Sensors are provided to specifically locate the cassette with respect to a cassette home position along the third orthogonal axis of the cassette receiving envelope.

The present invention also provides an assembly which operates to protect the carriage mechanism and its associated cassette transfer assembly by re-positioning cassettes within the bin structure with respect to a fixed reference point on the carriage mechanism, such mechanism operable to sweep all X-Y coordinates of the bin structure and displace the cassettes in its path. To cooperate with the cassette transfer assembly, a pusher element is provided at the front of the carriage mechanism to assure that the cassettes loaded into the bin structure will not interfere with the normal operation of the carriage mechanism. The pusher element re-positions cassettes which are in a potentially interfering position with the carriage mechanism when the picker assembly sweeps all X-Y coordinates of the bin structure.

BRIEF DESCRIPTION OF THE DRAWINGS

A better understanding of the invention can be obtained by considering the following detailed description together with the accompanying drawings which illustrate a preferred embodiment of the present invention as used in a cart spot player having a cassette library for storing magnetic tape cassettes in which.

DESCRIPTION OF THE PREFERRED EMBODIMENT

Figure 1:
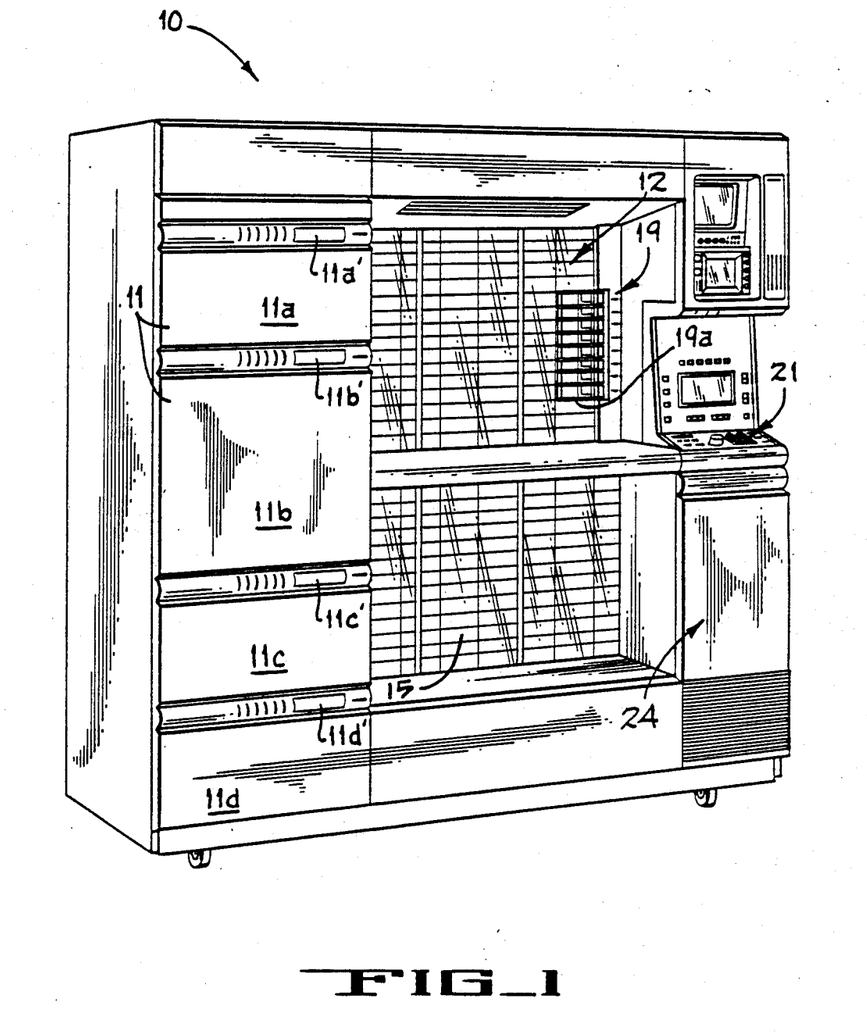
FIG. 1 is a perspective view of one side of the cart spot player.
Figure 2:
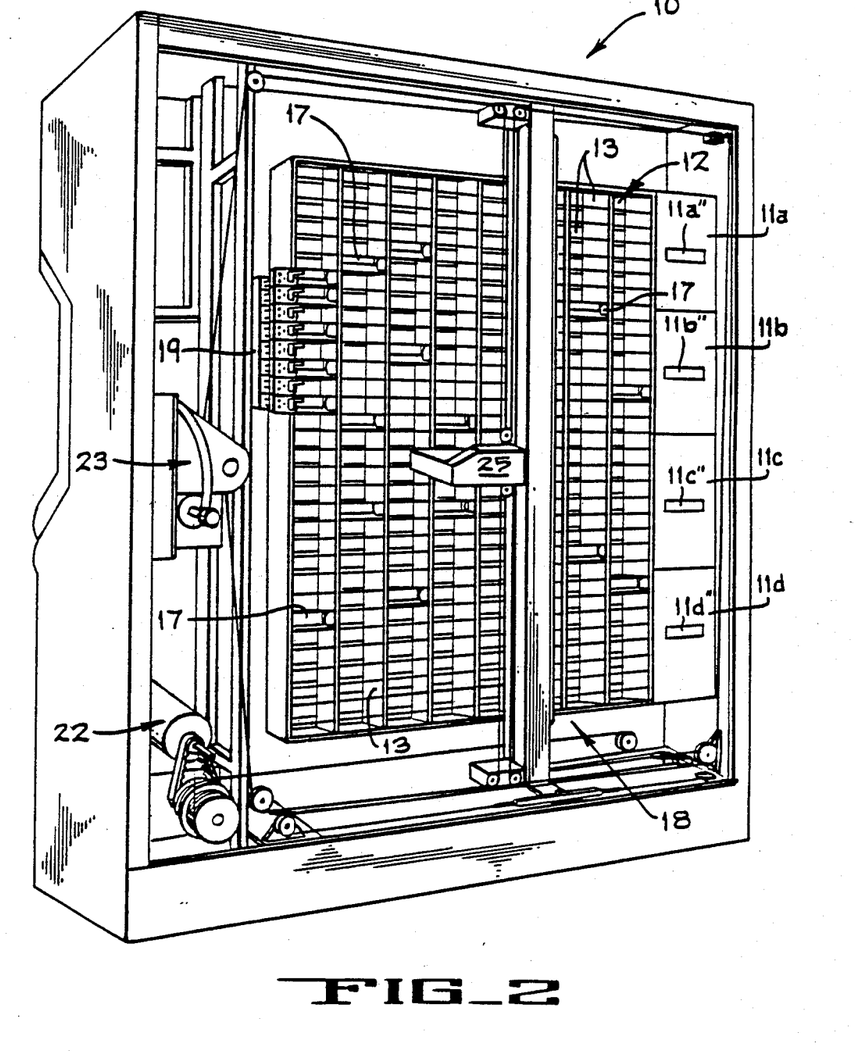
FIG. 2 is a perspective view of the opposite side of the cart spot player of FIG. 1.
Figure 3:
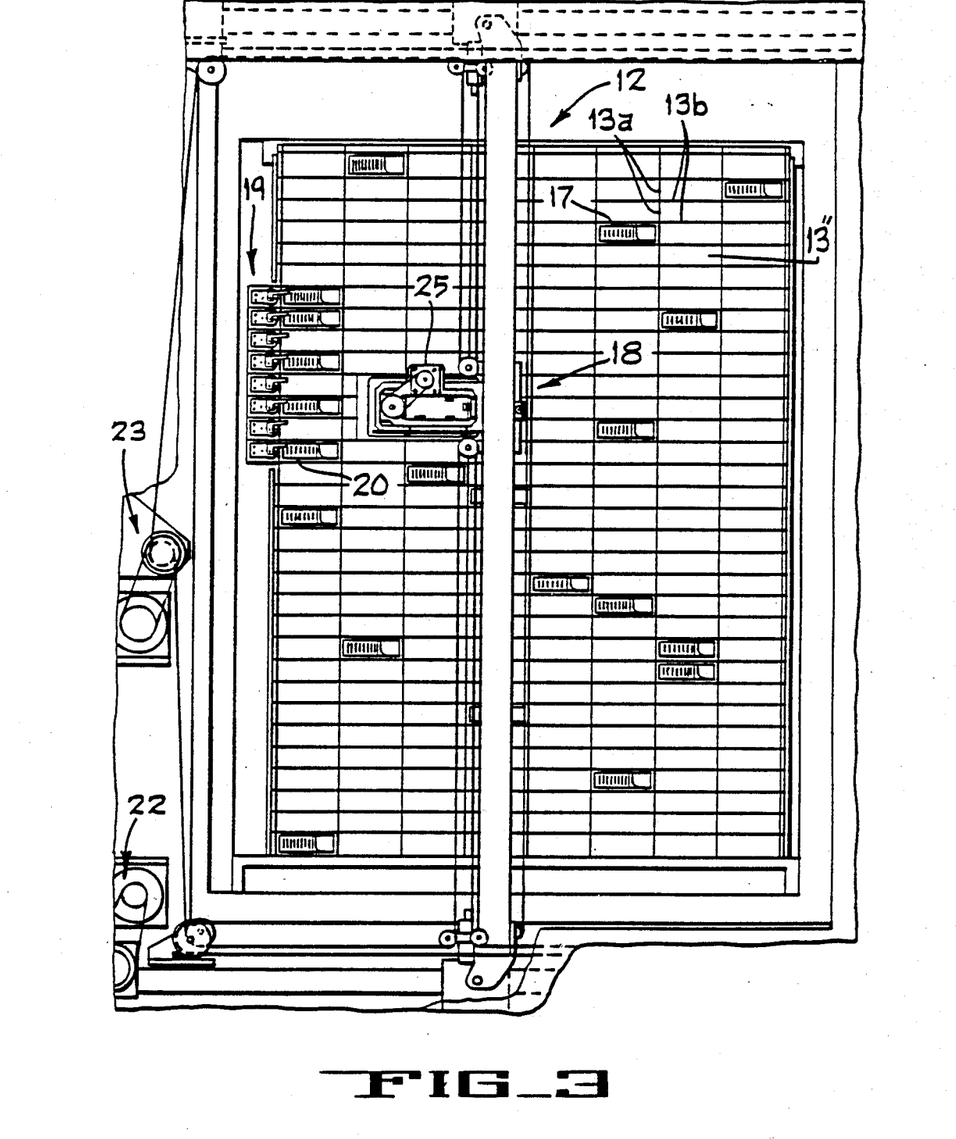
FIG. 3 is an elevational view of a portion of the opposite side of the cart spot player shown in FIG. 2 with certain features thereof shown in greater detail.

Referring first to FIGS. 1, and 2 and 3 there is shown one side of a cart spot player 10 comprising a tape transport stack 11 of tape transports 11a, b, c, d adjacent a cassette library 12. The cassette library or bin structure 12 is an integral part of the cart spot player 10 and comprises a linear array of bins or bin locations 13, each of the bins 13 having an open face 13" disposed along respective X and Y axes of the bin structure 13. The bin structure 12 is designed so that all of the bins 13 are generally the same size and are arranged in stacked relation, with each of the stacks 16 aligned with the remaining stacks 16, so that in the preferred embodiment the bin structure 12 presents an array of 8 stacks, each having 32 bins. The bin array may also be viewed as 32 horizontal rows and 8 vertical columns to present to the user an array of 256 bins of equal size in the bin structure 12.

Each bin 13 includes side plates 13a of equal size, and top and bottom plates 13b, also of equal size, which frame the open face 13". The bottom wall 13b of a first bin 13 is a top wall 13b of the adjacent lower bin 13 in a stack 16. The longest dimension of the open face 13 of the bin 13 is defined by the length of top and bottom plates 13b. This dimension is slightly larger than the width of the cassette 17 to be loaded into the bin 13. The bottom plate 13b is not solid but rather provides a frame which presents enough of a surface to support the cassette 17. When the cassette 17 is loaded into a bin 13, opposite ends of the cassette 17 will protrude from opposite ends of the bin 13, preferably by somewhat less than one inch at each end. In the preferred embodiment, a spring detent 14, fastened at one edge of the top wall 13b, presents a notch 14a which extends downwardly at a mid-line of the bin 13 to engage the cassette 17 at mid-portion in a groove 17a provided at one edge thereof to retain the cassette 17 within the bin 13 to facilitate both manual and automated input/output.

In the bin structure 12 as described above, the vast majority of bin locations are dedicated to archival storage. However, the cart spot player 10 of the present invention provides an automated cassette loading mechanism wherein the archival storage bins 13 are not loaded manually but rather are loaded by a cassette transfer assembly 18 mounted on the cart spot player 10 for cooperative movement along the X and Y axes defined by the bin structure 12 and the tape transport stack 11. To control cassette input to the bin structure 12, the player 10 has provided within the bin structure 12 a cassette loading and unloading station 19 which receives cassettes 17 manually from one side for automated withdrawal from the other side by the cassette transfer assembly 18 for input to the bin structure 12. In the preferred embodiment the cassette loading/unloading station 19 is provided at the left hand edge of the bin structure 12 and includes eight cassette receiving ports 20, but the number and location of such ports 20 may differ in other embodiments.

A more detailed description of the cassette loading and unloading station 19, may be found in U.S. patent application Ser. No. 851,069, entitled "Cassette Loading/Unloading Station", filed Apr. 11, 1986, and assigned to the assignee of the present invention.

The cassette transfer assembly 18 also accesses the storage bins 13 to move a cassette from the storage bins 13 to an input/output port 11" in one of the tape transports 11 for play. It is implicit in any discussion of the cassette loading/unloading station 19, the bin structure 12 and the tape transports 11 that all receptacles described in connection therewith have a dual input/output function; e.g., the bin 13 which receives a cassette input from the loading station 19 may later provide a cassette output for delivery to the port 11" of a tape transport 11 for input.

Each of the bins 13 and the tape transport ports 11 has a specific cassette loading location defined by X and Y coordinates and the cassette transfer assembly 18 is moveable in the X and Y directions to specifically locate the assembly 18 with respect to a particular bin location 13 or tape transport port location 11''. The cassette transfer assembly 18 is moved in the X and Y directions by a cable, pulley and motor combination 22 for the X direction and a cable, pulley and motor combination 23 for the Y direction. The X-Y mechanism is microprocessor-controlled, as by a processing unit 24 and a front control console 21 for controlling system operations and functions, to provide random access to the tape transports 11, the bin structure 12 and the cassette loading/unloading station 19, and is operable to access all X-Y coordinates of the bin structure 12 and the tape transports 11 not only in a random manner, but also in a controlled sweep of those coordinates. The processing unit 24 also controls the speed of the X-Y mechanism. A more detailed description of the structure and operation of the X-Y mechanism, may be found in U.S. application Ser. No. 851,008, entitled "Bidirectional Transfer Mechanism", filed Apr. 11, 1986, and assigned to the assignee of the present invention.

Mounted on the cassette transfer assembly 18 for X-Y movement with respect to the bin structure 12, and the tape transport stack 11 is a carriage mechanism 25, shown in greater detail in FIGS. 4 through 7. The frame 26 of the carriage mechanism 25 is generally the size and shape of a cigar box in the preferred embodiment, with side rails 28 and 29 connected to respective front and rear end plates 30 and 31. The side rail 28 is a mostly solid, elongated member extending between the end plates 30 and 31. The side rail 29 is substantially wider than the rail 28, but has a large, elongated central opening 33 which is defined by relatively thin front, rear, top and bottom portions of the side rail 29. Provided slightly forward of mid-rail and integral therewith is a vertical rib 29a. Forward of the vertical rib 29a, and closer to the front end plate 30 than to the vertical rib 29a is a second vertical rib 29b, which is also integral with the rail 29. A third vertical rib 29c, integral with the rail 29, is provided between the rear plate 31 and the crossmember 29a. The vertical ribs 29a, 29b and 29c substantially stabilize and strengthen the rail 29. The side rails 28 and 29 are connected to end plates 30 and 31 by screws 32. There are two connecting points in each end of each rail to connect each rail end with its respective end plate. The frame 26 thus provides a combination of light weight elements joined to form a compact, light weight, rugged support member for the carriage mechanism 25 suitable for use in the high speed environment of the cart spot player 10.

The carriage mechanism 25 must be mounted on the cassette transfer assembly 18 for positioning with respect to the bin structure 12. Therefore the connecting mechanism between the carriage mechanism 25 and the cassette transfer assembly 18 is a mounting plate 33 which engages the carriage mechanism 25 at vertical rib 29a at upper and lower points 33a and 33b, respectively, and the rail 28 at a point 33c opposite. An extension 34 of mounting rail 33 provides a first member for engaging a moveable collar 35 provided on a rail 36 associated with the Y axis of the cassette transfer assembly 18. Displaced toward the cassette receiving end of the carriage mechanism 25 and mounted at the crossmember 29b is a second extension 37 complementary to the extension 34 for engaging the opposite side of the collar 35.

Provided in each of the end plates 30 and 31 are relatively large openings 38 and 39, respectively. The openings 38 and 39 are somewhat larger than the faces 14 of the bin structure 12 or the end face 17b of the cassette 17 received therein. Extending between the end plates 30 and 31 are a pair of cassette guide rails 40 and 41 which are mounted at inner edges 38a, 39a of openings 38, 39 on respective bottom portion 30a and 31a of end plates 30, 31. The rails 40 and 41 are generally parallel to each other as well as being generally parallel to the side rails 28 and 29 and are displaced sufficiently from each other to adequately support a cassette 17 lying thereon. A first fixed cassette locating rail 42 is mounted at respective first side portions 30b, 31b of respective end plates 30, 31 at respective inner edges 38b, 39b of openings 38, 39 and extends therebetween to be generally parallel with the cassette guide rails 40 and 41.

Similarly mounted opposite the locating rail 42 is a first cassette positioning rail 43 having opposite ends connected to respective sides 30c, 31c of end plates 30 and 31 which are opposite the sides 30b, 31b. The cassette positioning rail 43 is generally parallel to, but not coplanar with, the rails 40, 41 and 42. However the cassette positioning rail 43 is secured to end plates 30 and 31 by a pair of biasing fastener assemblies 44, each including a spring 44a to permit limited movement of the rail 43 with respect to the end plates 30 and 31 and also to bias the position of the cassette 17 with respect to the carriage mechanism 25. Mounted on respective upper portions 30d, 31d of the end plates 30 and 31 to extend therebetween is a second cassette positioning rail 45 having a pair of biasing fastener assemblies 46 including springs 46a securing the rail 45 to respective end plates 30 and 31. The cassette guide rails 40 and 41, the cassette locating rail 42, and the cassette positioning rails 43 and 45 define the X,Y coordinates of a unique cassette positioning envelope 49 provided within the carriage mechanism 25 designed to engage, and then bias, a cassette 17 drawn into the carriage mechanism 25, to an optimum selected stored position within the cassette-receiving envelope 49 for both transport and unloading at a selected bin location.

To support the electronics associated with the carriage mechanism 25, a circuit board 50 is attached to the carriage mechanism 25 at the bottom of the mounting plate 33 and at the bottom of the rear end plate 31. Secured to the circuit board 50 in a cassette receiving position is a U-shaped housing 54. One leg 58 of the housing 54 is so mounted to the circuit board 50 as to dispose a base portion 55 of the housing 54 to receive the end face 17b of a cassette 17 and serve as a stop for the cassette receiving envelope 49. An optical Z-axis cassette sensor 56 disposed at respective outer ends 58a of legs 58 of the U-shaped housing 54 senses the presence of a cassette 17 within the housing 54.

To draw the cassette 17 into the cassette receiving envelope 49, the cassette transfer assembly 18 aligns the carriage mechanism 25 with a bin 13 holding the cassette 17. The carriage mechanism 25 employs a Z-axis picker 57 which employs a locating mechanism or "knee" 59 of substantial precision which can engage a cassette 17, even if mispositioned, and push it forward to a preset position to locate a target zone 60 on the cassette, the target zone 60 having an engageable portion or groove 61. The cassette transfer assembly 18 then inserts a cassette hook 62 associated with the locating mechanism 59 into the groove 61 in the cassette 17, and the carriage mechanism 25 extracts the cassette 17 from the bin location 13 and draws it into the cassette receiving envelope 49 for transport.

The Z-axis picker 57 comprises a linear threadable drive 63 which provides a consistent repeatable linear output for the Z-axis picker 57 and includes a longitudinal threaded member or leadscrew shaft 64 mounted for rotation between end plates 30 and 31. A rear end 65 of the longitudinal threaded member 64 extends outwardly of the rear end plate 31 to fixedly engage a leadscrew pulley 66 which is connected by a timing belt 67 to a pulley motor drive 68 driven by a Z-axis motor assembly or motor 70 mounted on a motor mounting plate 71 which is secured to an upper extension 72 of rear end plate 31. The motor 70 is relatively sophisticated and includes a position indicating incremental optical encoder 95, which precisely positions the locating mechanism 59 with respect to the cassette 17, and which is operatively connected to a second Z-axis position sensor 73, mounted on the circuit board 50 and generally located between the vertical ribs 29a and 29b, and in the preferred embodiment is electromagnetically controlled to provide cassette position information which is coordinated with the position information generated by the encoder 95.

The leadscrew shaft 64 is mounted adjacent the side rail 28 on bearing members 74 and 75 mounted in respective end plates 30 and 31. Mounted on the leadscrew shaft 64 is the Z-axis hook assembly 76 which includes a bearing plate 78 mounted generally perpendicular to the longitudinal axis of the leadscrew shaft 64 for supporting bearing bushings 79 and 80 provided therein for engaging respective picker shafts 81 and 82 connected between end plates 30 and 31 of the carriage mechanism 25. The bearing plate 78 also supports a leadscrew mechanism 77 for moving the assembly 76 along the leadscrew shaft 64. Shafts 81 and 82 stabilize the assembly 76. A hook support member 84 is mounted on bearing plate 78 to extend generally in the Z direction with respect to the coordinate axes of the carriage mechanism 25 and carries the cassette hook 62 at its outer end. Displaced inwardly from the cassette hook 62 is the locating mechanism or knee 59 integral with the member 84, and extending at a right angle from the front of the member 84 to engage a cassette 17 as well as to provide a reference plane for aligning the cassette 17 with respect to the envelope 49. At the inner end of the member 84 is a magnetic vane 87 which cooperates with the position sensor 73.

Figure 4:
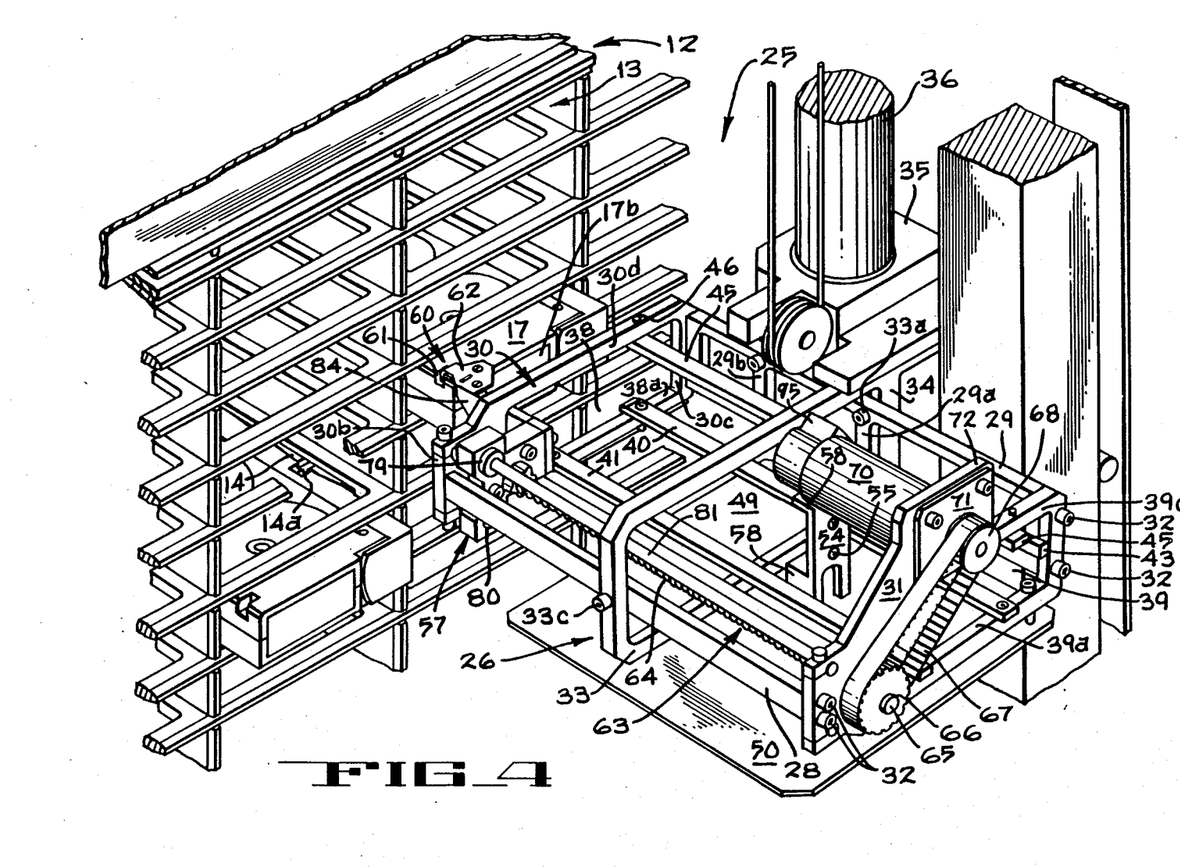
FIG. 4 is a perspective view of the carriage mechanism of the present invention, with a portion of the bin structure included therewith, the cassette hook extended and engaged with a cassette stored in a bin of the bin structure.
Figure 5:
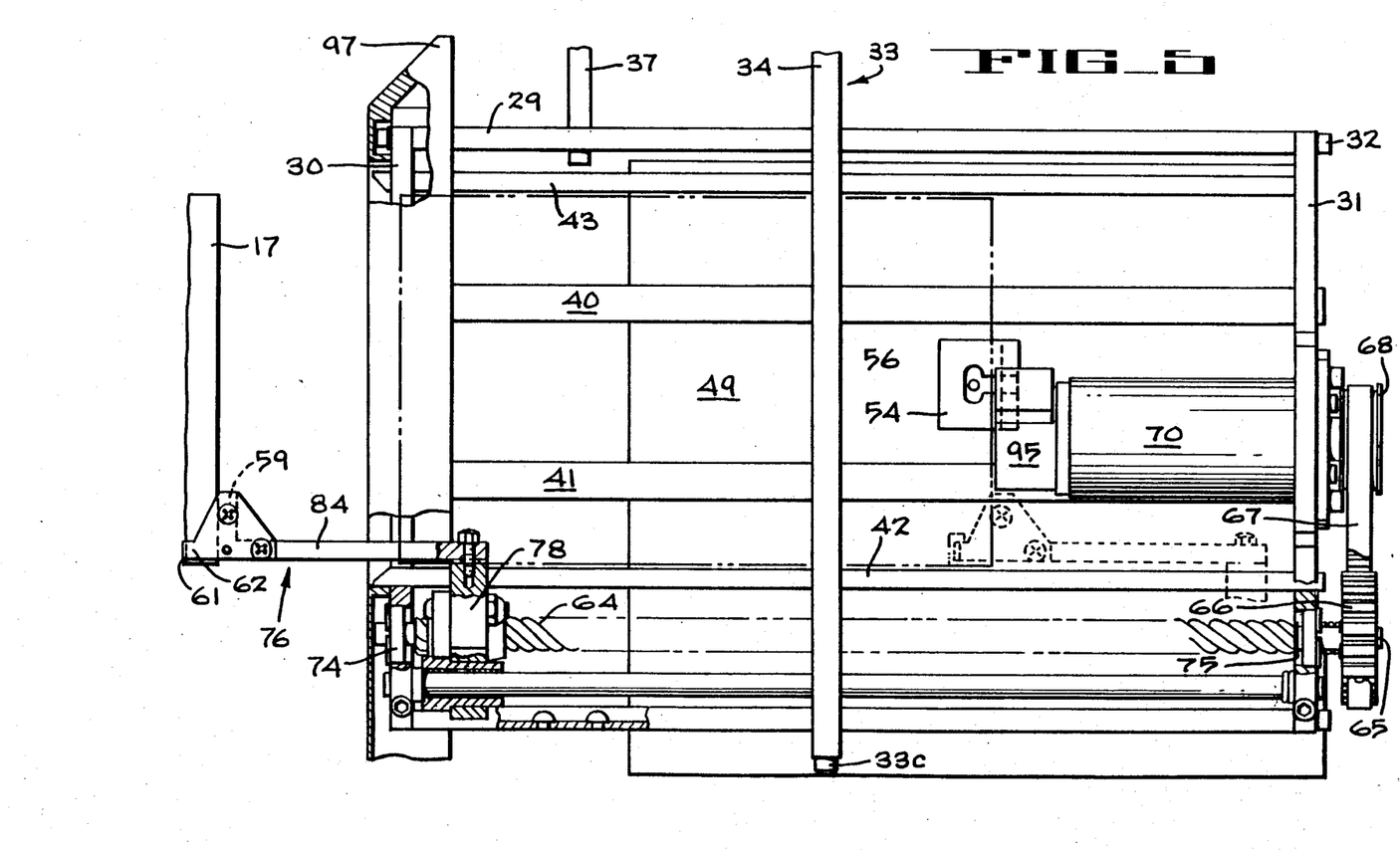
FIG. 5 is a plan view of the carriage mechanism of FIG. 4 with the cassette hook engaging a cassette, a rear portion of the cassette shown in FIG. 5, the cassette and the Z-axis picker also shown in phantom at a fully retracted position of the Z-axis picker.
Figure 6:
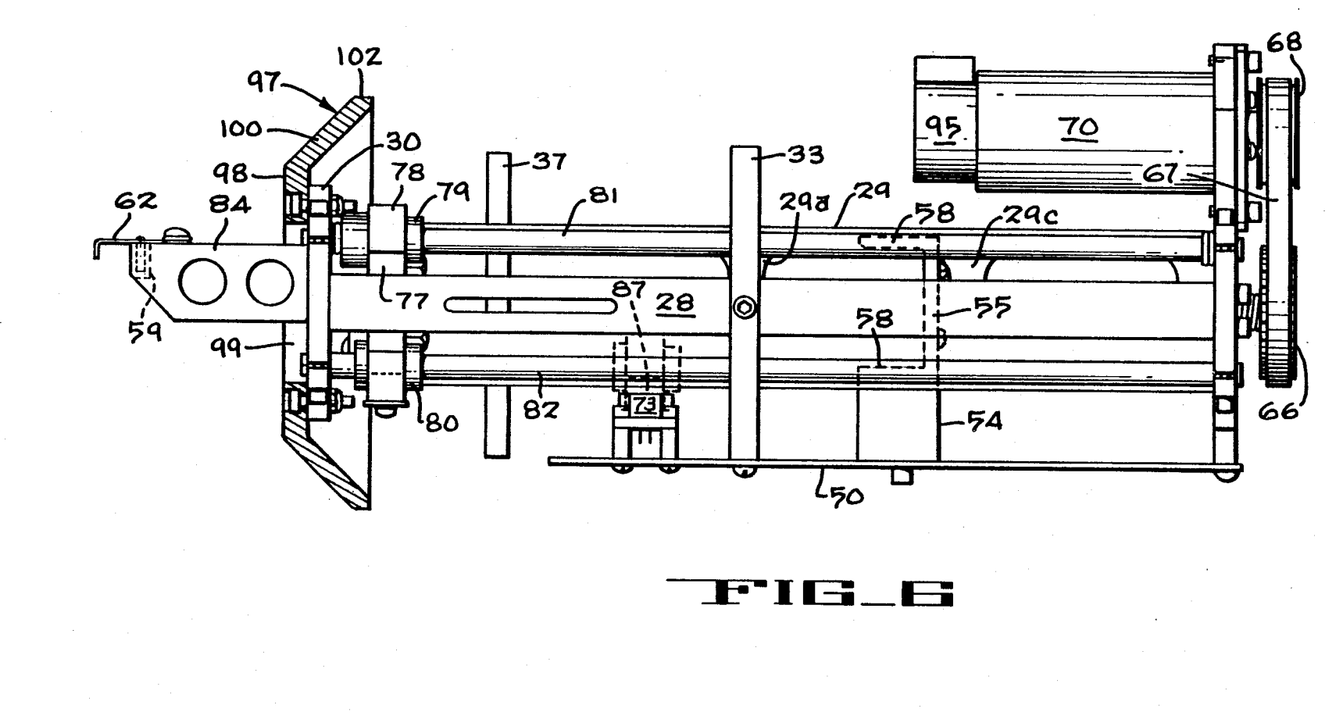
FIG. 6 is a side elevation of the carriage mechanism of FIG. 5.
Figure 7:
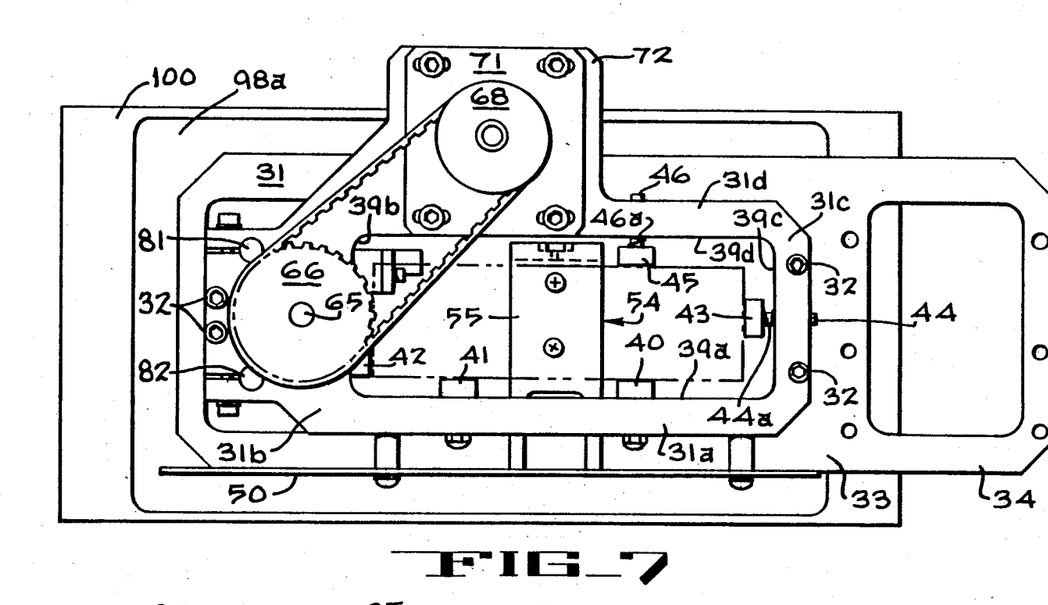
FIG. 7 is a rear end view of the carriage mechanism of FIG. 5.

The cassette 17 includes a target zone 60 at a forward edge thereof, the target zone 60 including a groove 61 of generous proportions, the width of the groove 61 being at least 4 times the width of the engaging portion of the cassette hook 62. The groove 61 is also located along the same side of the cassette 17 as the detent groove 17a, to minimize torque loads when the picker 57 extracts the cassette 17 from the bin 13.

Additional electronics are mounted on the circuit board 50 to support the Z-axis motor assembly 70, the two position sensors 56 and 73, the encoder 95 associated with the motor drive, and the electronics for a related cassette location sensing apparatus (not shown).

Figure 8:
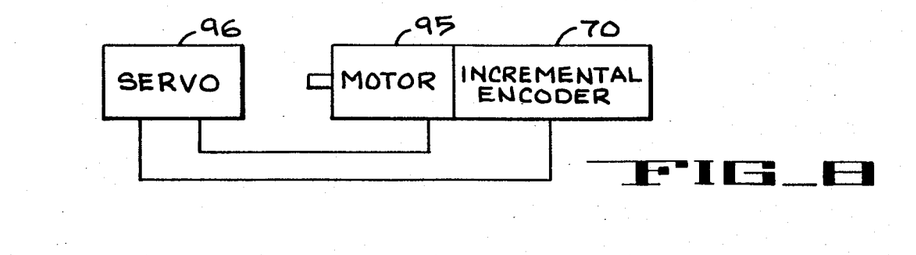
FIG. 8 is a block diagram of the circuitry associated with the motor driving the Z-axis picker.

As seen in FIG. 8, associated with the motor assembly 70 is the position indicating incremental optical encoder 95 which transmits position information to a servo mechanism 96 which uses the position information for driving the motor 70.

The operation of the carriage mechanism 25 is as follows. The cassette transfer assembly 18 moves to a selected X-Y coordinate which defines a specific bin location 13. The carriage mechanism 25 is aligned with the specified bin location 13 and displaced therefrom so that the front of the carriage mechanism 25 is disposed within a quarter inch from the cassette 17 located in the bin 13. The servo mechanism 96 drives the motor 70 to drive the leadscrew shaft 64 and the Z-axis picker 57 mounted thereon toward the front of the carriage assembly 25. When the magnetic vane 87 passes through the sensor 73 mounted on the circuit board 50, the cassette hook 62 is positioned slightly inside of the front face of the carriage mechanism 25 and a signal input from the sensor 73 to the servo mechanism 96 initializes the position of the cassette hook 62 with respect to a designated reference point.

The servo mechanism 96 then supplies position information to the motor 70 to drive the Z-axis picker 57 forward a fixed predetermined distance sufficient to locate the cassette 17 and push it toward the bin 13 with the knee 59, the picker 57 concurrently aligning the cassette hook 62 over the groove 61 in the target zone 60 and also aligning the knee 59 with the edge of the cassette 17. The seeking, locating and aligning functions of the Z-axis picker 57 occur swiftly and accurately, and are repeatable to readily achieve the operating parameters demanded of such mechanism within an automated loading environment for cassettes. When the cassette hook 62 is aligned with the groove 61, the cassette transfer assembly 18 lowers the carriage mechanism 25 to drop the cassette hook 62 into the groove 61.

The servo mechanism 96 then drives the motor 70 backward to withdraw the cassette 17 out of the bin location 13 into the cassette receiving envelope 49 to a selected stored position in the cassette-receiving envelope 49 defined by the rails 40, 41, 42, 43 and 45 and the housing 54 and configured to provide substantially improved cassette transport and unloading characteristics for the carriage mechanism 25. Although servo information positions the cassette 17 within the cassette receiving envelope 49 at the selected stored position with respect to the Z-axis, the optical sensor 56 also senses a Z-axis home position for the cassette 17. With the cassette 17 in place, the carriage mechanism 25 may be transported to a second bin location 13 remote from the first bin location by the cassette transfer assembly 18 where the Z-axis picker 57 can be activated to load the cassette 17 into the second bin location 13. The cassette transfer assembly 18 and the carriage assembly 25 also load, unload and access the tape transports 11 of the integrated cart spot player 10 in the same manner and with the same mechanisms as described above.

Provided at the front of the carriage mechanism 25 is a pusher element 97 having a plate 98 which is mounted to the front of the carriage mechanism 25. The plate 98 has an opening 99 aligned with and generally the same size as the opening 38 in the front plate 30. The plate 98 is somewhat larger than the front plate 30 to have a lateral extension 98a beyond the frame 26 at the side opposite the rail 36. Provided at the periphery of the plate 98 is a collar 100 which slopes outwardly and rearwardly toward a rectangular peripheral edge 102. The pusher element 97, mounted on the carriage mechanism 25 defines an apparatus particularly suited to sweep all X-Y coordinates of the bin structure 12.

The bin structure 12, which can be accessed from both sides, has a transparent door 15 covering the side opposite the cassette transfer assembly 18. That door may be opened if, for example, there is a need to load the bin structure 12 manually. After a manual loading, to assure the cassettes 17 have not been loaded in a manner to interfere with the operation of the cassette transfer assembly 18, the carriage mechanism 25 drives the pusher element 97 before it, to displace any cassette 17 which have been placed in a potentially interferring relation with the carriage mechanism 25. Such a sweep is typically done at low speeds, so that a severly misplaced cassette does not damage the carriage mechanism 25.

Having described the preferred embodiment of the present invention, it should be understood that such invention is not limited to the above description and that changes and modifications may be made therein without affecting the scope and contents thereof. Such scope is to be defined only by the appended claims.

What is claimed is:

1. In a bin structure having discrete bin locations for storing individual cassettes, a carriage mechanism displaced from the bin structure for linear transport of a cassette with respect to the bin structure comprising:
    a cassette envelope for receiving a cassette, said envelope defined by a plurality of support rails for supporting the cassette in the envelope, said rails movable relative to each other to bias the cassette to an optimum holding position within the envelope, said holding position defined by orthogonal coordinates along respective coordinate axes with at least one first moveable support rail and at least one second movable support rail operative to bias the cassette along respective first and second coordinate axes of the envelope toward the optimum holding position for the cassette within the envelope, thereby to minimize movement of the cassette during transport by the carriage mechanism, as well as to minimize mis-insertion of the cassette into and out of the envelope;
    an extracting mechanism for extracting the cassette from a first bin location and out of the bin structure and drawing it into the envelope; and
    positioning apparatus for positioning the cassette with respect to a third axis of the envelope, and at the optimum holding position for the cassette within the envelope, and the cassette extracting mechanism cooperating with the support rails and the positioning apparatus to assure delivery of the cassette to the optimum holding position within the cassette receiving envelope, such position stabilizing the carriage mechanism for movement in the loaded position and preventing obstructive engagement of the cassette with the bin structure as the carriage mechanism moves the cassette from one bin location to another in the bin structure.

2. A carriage mechanism as claimed in claim 1 wherein the extracting mechanism includes a cassette hook for first positively engaging, and then extracting the cassette from the bin location and drawing it into the cassette receiving envelope and out of an interfering relationship with the bin structure.

3. A carriage mechanism as claimed in claim 1 wherein the cassette positioning apparatus comprises at least one sensor for sensing the position of the cassette with respect to the third axis of the envelope.

4. A carriage mechanism as claimed in claim 3 including an optical sensor for sensing the presence of the cassette within the envelope.

5. A carriage mechanism as claimed in claim 1 wherein the cassette positioning apparatus comprises a position servo for locating the cassette at a predetermined position with respect to the third axis of the envelope.

6. A carriage mechanism as claimed in claim 1 wherein the moveable rails are mounted for biasing movement with respect to the envelope, to bias a cassette entering the envelope to the optimum holding position.

7. A carriage mechanism as claims in claim 6 wherein the positioning apparatus comprises at least one sensor for sensing the position of the cassette in the envelope with respect to the third axis of the envelope.

8. A carriage mechanism as claimed in claim 1 wherein the positioning apparatus comprises at least one sensor for sensing the position of the cassette with respect to the third axis of the envelope.

9. In a bin structure for storing individual cassettes at discrete bin locations a moveable carriage mechanism displaced from the bin structure for linear transport of a cassette with respect to the bin structure, a method for storing a cassette in the carriage mechanism comprising:
    providing a cassette envelope for receiving a cassette in the carriage mechanism, said envelope defined by a plurality of support rails, said rails moveable relative to each other to bias the cassette along respective first and second coordinate axes and into an optimum holding position for the cassette within the envelope;
    extracting the cassette from a first bin location and out of the bin structure and drawing it into the envelope with an extracting mechanism associated with the moveable carriage mechanism; and
    using the extracting mechanism and the support rails to position the cassette within the envelope at the optimum holding position and separate from the bin structure as defined by selected coordinates on first, second and third coordinate axes of the envelope, to stabilize the carriage mechanism for movement with a cassette loaded into the carriage mechanism and to prevent obstructive engagement of the cassette with the bin structure as the carriage mechanism moves the cassette from one bin location to another in the bin structure.

10. In a bin structure having discrete bin locations for storing individual cassettes, each cassette having an engageable portion thereon, a carriage mechanism displaced from and linearly moveable with respect to the bin structure for extracting a cassette from a first bin location and out of the bin structure, loading the cassette into the carriage mechanism and transporting the cassette to a second bin location remote from the first bin location for insertion, into said second bin the carriage mechanism comprising:
    a cassette hook for positively engaging the cassette;
    driving means connected between the carriage mechanism and the cassette hook for driving the cassette hook in a first direction into engagement with the cassette;
    a locating knee portion displaced from and cooperative with the cassette hook for locating the engageable portion on the cassette and aligning it with the cassette hook for engagement;

an inserting portion provided on the cassette hook and cooperative with the locating knee portion to engage the engageable portion of the cassette; and inserting means for displacing the carriage to insert the inserting portion into the engageable portion of the cassette, the locating knee portion locating the engageable portion of the cassette, the inserting means inserting the inserting portion into engagement with the engageable portion of the cassette, to secure the cassette to the carriage mechanism, the driving means then cooperating with the engaging means to drive the engaging means in a second direction to extract the cassette from the first bin location and out of the bin structure and load it into the carriage mechanism for linear transport to a second bin location.

11. A carriage mechanism as claimed in claim 10 wherein the driving means provided between the carriage mechanism and the engaging means is a linear screw drive mechanism which drives the engaging means into engagement with the cassette.

12. A carriage mechanism as claimed in claim 11 wherein the engageable portion of the cassette includes a groove for engagement with the cassette hook.

13. A carriage mechanism as claimed in claim 11 wherein the drive mechanism is positioned by positioning means which establishes at least an initial position for a drive sequence, an extended position, as a retracted position for the cassette hook.

14. A carriage mechanism as claimed in claim 13 wherein a position servo cooperates with a sensor to define an initial position for a drive sequence.

15. A carriage mechanism as claimed in claim 10 wherein the engageable portion of the cassette includes a groove for engagement with the cassette hook of the engaging means.

16. A carriage mechanism as claimed in claim 10, wherein the bin structure is defined by X and Y coordinates on respective X and Y coordinate axes and the carriage mechanism is movable to sweep all X-Y coordinates of the bin structure, a pusher element mounted on the carriage mechanism at a fixed reference point with respect to a coordinate axis, said pusher element having at least one sloped face, the carriage mechanism driving the sloped face of the pusher element for engagement with the cassettes in the bin structure to return all cassettes which protrude out of their respective bin locations and beyond the fixed reference point, each to an aligned position in its respective bin, to prevent the mispositioned cassettes in the bin structure from interferring with the movement of the carriage mechanism.

17. In a bin structure having discrete bin locations for storing individual cassettes, and a carriage mechanism displaced from the bin structure and moveable linearly with respect to the bin structure, said mechanism extracting a cassette from a first bin location and out of the bin structure, loading the cassette into the carriage mechanism and transporting, the cassette to a second bin location remote from the first bin location for insertion, a method of extracting a cassette from the bin structure and loading it into the carriage mechanism comprising:

driving a cassette hook on the carriage mechanism in a first direction, to drive an engaging knee portion cooperative with the hook into engagement with a cassette to locate an engageable portion on the cassette;

aligning the engageable portion of the cassette with the cassette hook;

inserting an inserting portion of the cassette hook into the engageable portion of the cassette to secure the cassette to the carriage mechanism; and driving the cassette hook in a second direction to extract the cassette from the bin location and out of the bin structure and load it into the carriage mechanism for linear transport to a second bin location.

18. In a bin structure having discrete bin locations for individual cassettes defined by orthogonal coordinates on respective first, second and third axes, a carriage mechanism displaced from the bin structure for linearly moving a cassette from a first bin location to a second bin location in the bin structure from the first bin location, said carriage mechanism including a pusher element mounted on the front of the carriage mechanism at a fixed reference point with respect to a first orthogonal axis, the pusher element having at least one sloped face, the carriage mechanism moveable to sweep all coordinates of the second and third orthogonal axes of the bin structure, driving the sloped face of the pusher element for passing engagement with the cassettes in the bin structure to return all cassettes which protrude out of their respective bin locations beyond the fixed reference point, each to an aligned position in its respective bin to prevent such cassettes from interfering with the movement of the carriage mechanism.

19. In a bin structure having discrete bin locations for individual cassettes defined by orthogonal coordinates on respective first, second and third axes, a carriage mechanism for moving a cassette from a first bin location to a second bin location displaced from the first bin location, including a pusher element having:

a front plate mounted at the front of the carriage mechanism;

a peripheral collar provided on the front plate and sloping outwardly and rearwardly toward an engagement collar of a substantially larger perimeter than the front plate, the peripheral collar located at a fixed reference point with respect to a first orthogonal axis, the carriage mechanism moveable to sweep all coordinates of the second and third orthogonal axes of the bin structure, driving the pusher element for passing engagement with the cassettes in the bin structure, the peripheral collar returning the cassettes which protrude out of their bin locations and beyond the fixed reference point, each to an aligned position in its respective bin, thus preventing such cassettes from interfering with the movement of the carriage mechanism.

20. In a bin structure having discrete bin locations for storing individual cassettes, a carriage mechanism displaced from the bin structure and for linearly transporting a cassette with respect to the bin structure comprising;

an outer frame formed of a pair of end plates joined by substantially linear connecting members, each of the end plates open to the interior of the frame;

linear support rails extending between respective interior edges of the end plates and rigidly fastened thereto;

a first locating rail mounted between respective interior aligned side edges of the end plates;

a first positioning rail mounted at opposite side edges of the end plates, the positioning side rail mounted to the end plates by a biasing means for biasing movement;

a second positioning rail mounted to an upper edge of the respective end plates by a biasing means for biasing movement; and an engagement member mounted between the end plates, with the support rails, the locating rail, the positioning rails and the engagement member cooperating to define, an optimum holding position for a cassette within the carriage mechanism, and moveable relative to each other to bias a cassette inserted into the carriage mechanism to the optimum holding position.

21. In a bin structure having discrete bin locations for storing individual cassettes, each cassette having a designated target zone including an engagement groove at one edge thereof, a carriage mechanism displaced from the bin structure and moveable with respect to the bin structure and used for extracting a cassette from a first bin location and out of the bin structure, loading the cassette into the carriage mechanism and transporting the cassette to a second bin location remote from the first bin location for insertion, the carriage mechanism comprising:

a Z-axis picker for engaging the cassette;

a linear screw drive mechanism connected between the carriage mechanism and the Z-axis picker for driving the Z-axis picker in a first direction into engagement with the cassette;

a locating knee operative with the Z-axis picker for locating the designated target zone on the cassette and aligning the Z-axis picker for engagement with the engageable groove in the target zone; and a cassette hook provided on the Z-axis picker and cooperable with the locating knee to engage the engageable groove; the locating knee locating the target zone of the cassette, the carriage mechanism moveable to insert the cassette hook of the Z-axis picker into the engageable groove in the target zone of the cassette to secure the cassette to the carriage mechanism, the linear drive mechanism then driving the Z-axis picker in a second direction opposite to the first direction to extract the cassette from the first bin location in the bin structure and load it into the carriage mechanism for transport.

* * * * *